(12) United States Patent
Jones, Sr.

(10) Patent No.: US 6,380,523 B1
(45) Date of Patent: Apr. 30, 2002

(54) TANK HEATING APPARATUS

(76) Inventor: W. Tommy Jones, Sr., 507 N. Main St., Staley, NC (US) 27355

( * ) Notice: Subject to any disclaimer, the term of this patent is extended or adjusted under 35 U.S.C. 154(b) by 0 days.

(21) Appl. No.: 09/718,621

(22) Filed: Nov. 24, 2000

(51) Int. Cl.⁷ .............................. H05B 3/34; H05B 11/00
(52) U.S. Cl. ...................................... 219/528; 219/212
(58) Field of Search ................................ 219/528, 529, 219/544, 546, 547, 548, 549, 535, 212

(56) References Cited

U.S. PATENT DOCUMENTS

| | | | |
|---|---|---|---|
| 1,992,593 A | * 2/1935 | Whitney | ..................... 219/528 |
| 3,696,233 A | * 10/1972 | Pulsifer | ..................... 219/535 |
| 3,968,348 A | 7/1976 | Stanfield | |
| 4,281,238 A | * 7/1981 | Noma et al. | ................. 219/535 |
| 4,329,569 A | * 5/1982 | Hjortsberg et al. | ......... 219/535 |
| 4,726,346 A | 2/1988 | Lucht | |
| 4,934,330 A | 6/1990 | Lindsay | |
| 5,714,738 A | * 2/1998 | Hauschulz et al. | ......... 219/535 |
| 5,827,050 A | * 10/1998 | Price | .......................... 219/528 |
| 5,981,910 A | 11/1999 | Williams et al. | |

* cited by examiner

Primary Examiner—Sang Paik

(57) ABSTRACT

An apparatus is provided for heating diesel fuel so as to prevent coagulating or gelling during extremely cold temperatures. The apparatus comprises a cover, made of a flexible material, containing within it a heating element. A cord is connected to the heating element capable of supplying power thereto. The cover is attached to the diesel fuel tank by releasable straps and the cord is connected to a power source for maintaining the fuel in a liquid state.

10 Claims, 4 Drawing Sheets

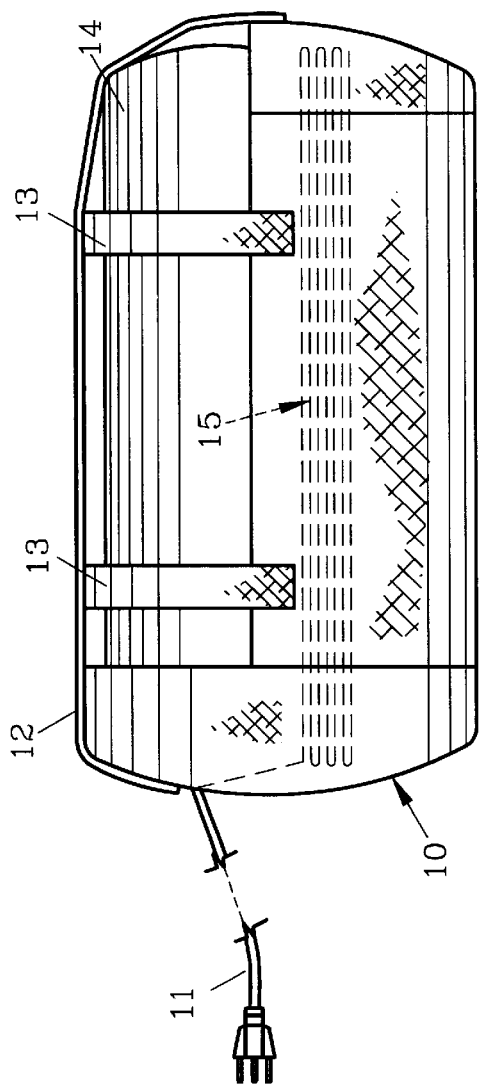
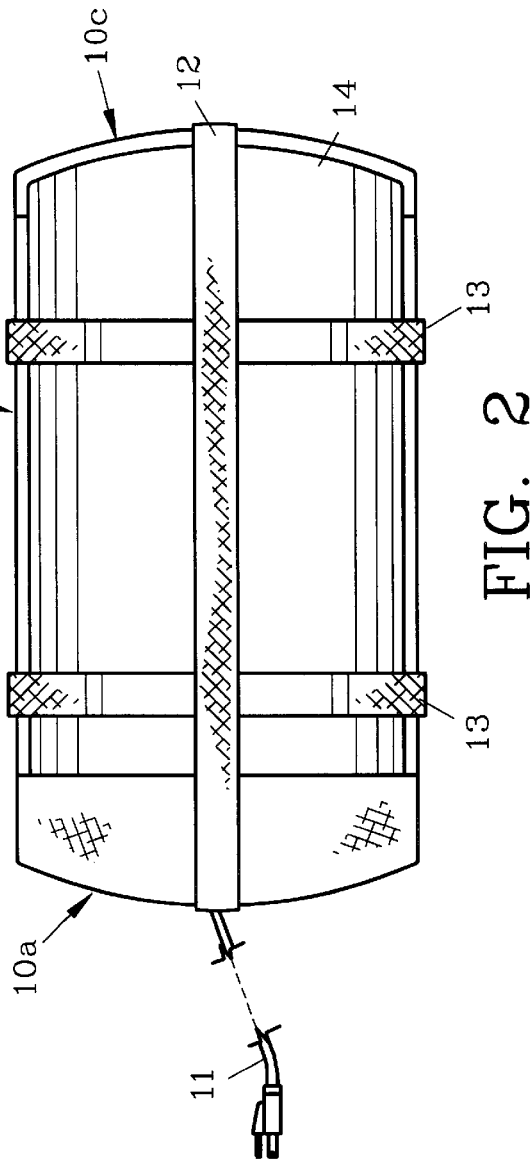

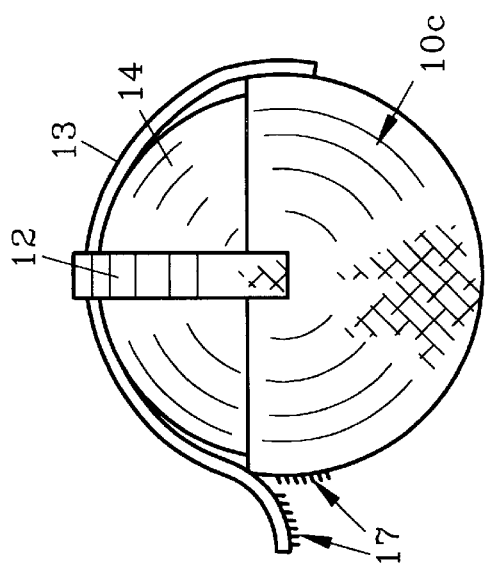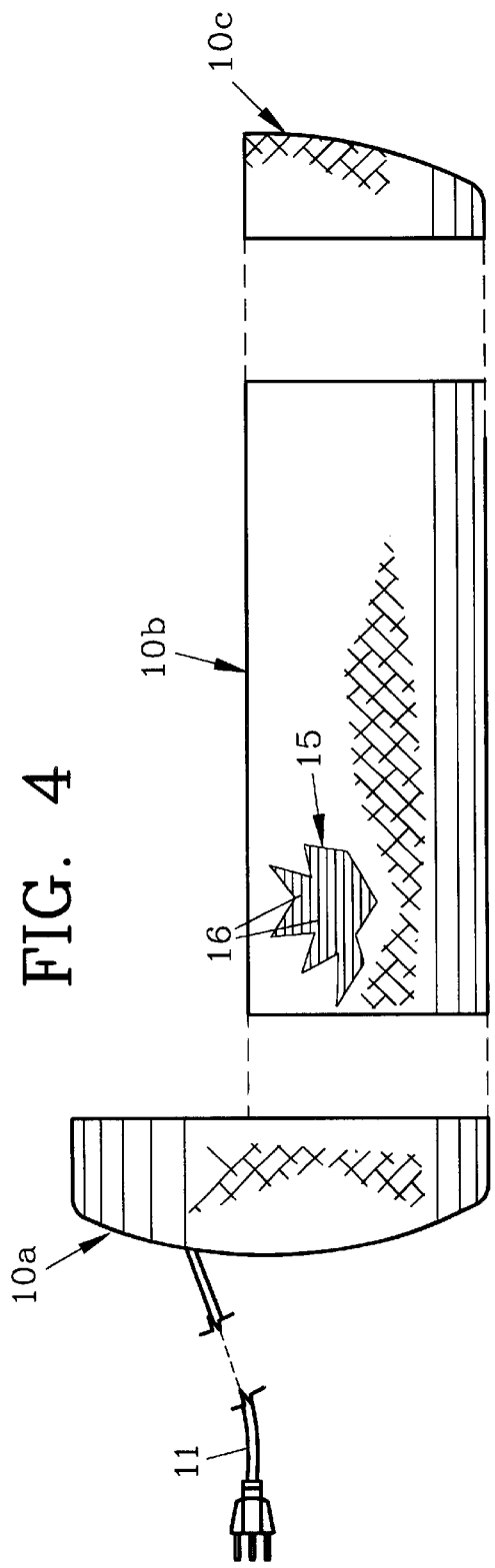

TANK HEATING APPARATUS

BACKGROUND OF THE INVENTION

1. Field of the Invention

The invention herein pertains to an apparatus for heating tanks so as to prevent fluid coagulating or gelling during extremely cold temperatures, and in particular, an apparatus for heating diesel fuel in a tank, such as contained in a cylindrical fuel tank mounted on a truck.

2. Description of the Prior Art and Objectives of the Invention

The fuel tank for a diesel engine of a truck is generally located outside of the truck's engine compartment, and is therefore subject to the outside ambient temperature. Diesel fuel will gel or coagulate when the ambient temperature is below 0° Celsius, thereby interfering with the truck's normal operation. There has been considerable research and development regarding maintaining diesel fuel and other industrial fluids at temperatures above 0° Celsius so as to prevent gelling.

U.S. Pat. No. 3,968,348 discloses a container heating jacket comprising a cylindrical wall structure with a resistance heating element. The invention can be used to heat large containers, such as 55 gallon drums of industrial liquid, however, it is not capable of being placed on a typical diesel fuel tank that is mounted on a truck.

U.S. Pat. Nos. 4,726,346 and 4,934,330 disclose immersion-type devices that have tubular members containing a heating element that are inserted into a fuel tank. Such devices are somewhat more complicated to make and install than the present invention.

U.S. Pat. No. 5,981,910 discloses a device for heating diesel fuel contained in a filter. The device comprises a cover containing a heating element that fits over a fuel filter. However, the device could not cover a mounted fuel tank.

Thus with the problems and shortcomings of prior devices, the present invention was conceived and one of its objectives is to offer a convenient apparatus for heating diesel fuel in a tank of a vehicle.

It is a further objective of the present invention to provide an apparatus for heating diesel fuel that can be easily placed on and is likewise easily removable by unskilled personnel from a mounted vehicle tank by utilizing releasable straps.

It is a further objective of the present invention to provide a diesel fuel heating apparatus that is relatively inexpensive to manufacture and purchase.

It is a further objective of the present invention to provide a diesel fuel heating apparatus that is foldable and capable of compact storage when not in use.

It is a further objective of the present invention to provide a diesel fuel heating apparatus that can be operated on a battery power source.

It is a further objective of the present invention to provide a diesel fuel heating apparatus that is durable, resistant to weather and abrasion, and suitable for outdoor use.

Various other objectives and advantages of the present invention will become apparent to those skilled in the art as a more detailed description is sea forth below.

SUMMARY OF THE INVENTION

The aforesaid and other objectives are realized by providing a cover made of a flexible material and containing within it an electrical resistance heating element. A cord is connected to the heating element capable of supplying power thereto. The cover which has a large open top area is easily placed on the mounted diesel fuel tank, and is held in place by releasable straps. The cord is connected to a power source. Preferably, the invention comprises both longitudinal and lateral, releasable top straps that hold the cover securely in place on the fuel tank.

The cover is preferably made of two plies of flexible and insulating material. The material is also durable, water repellant, and resistant to other harsh weather elements so as to be suitable for extended outdoor use. The two plies are assembled together so that there is an inner ply and an outer ply. Resistance wires are assembled in between the inner ply and outer ply, and the plies are fixed together, such as by sewing, gluing, heat welding or the like. An electrical cord is operatively connected to the heating resistance wires and preferably supplies DC power thereto. A toggle switch can be mounted on the dashboard of the vehicle on which the apparatus is being used, and operatively connected to the electrical cord of the apparatus so that a driver can turn the apparatus on and off while operating the vehicle.

The cover preferably has a semi-cylindrical shape that covers the lower half of the longitudinal surface of the fuel tank, along with a first or front-end portion that covers all of one end of the tank and approximately one-eighth of the upper half of the longitudinal surface, and a second or rear-end portion that partially covers the opposing end of the tank. Typically, the cover is placed on the bottom of the tank in accordance with the above configuration so that the tank sits in the cover in a trough-like manner, and releasable straps are run across the top of the tank to hold the cover to the tank. However, the cover can be tilted at various angles on the tank in order to accommodate contiguous structures, such as a fuel connector line.

The shape of the cover and its flexible nature, along with the use of releasable straps, enables the apparatus to conform to tanks of varying shapes and sizes, with contiguous structures at varying locations. Furthermore, the apparatus is relatively simple to use and can be easily placed on and removed from a fuel tank by unskilled personnel.

BRIEF DESCRIPTION OF THE DRAWINGS

FIG. 1 shows a right side-view of the preferred embodiment of the invention placed on a cylindrical fuel tank;

FIG. 2 demonstrates a top-view of the invention placed as seen in FIG. 1.

FIG. 3 features an exploded side-view schematic of certain components of the preferred embodiment of the invention as removed from a tank;

FIG. 4 depicts a rear-view of the preferred embodiment as seen in FIG. 1;

Figure 5:
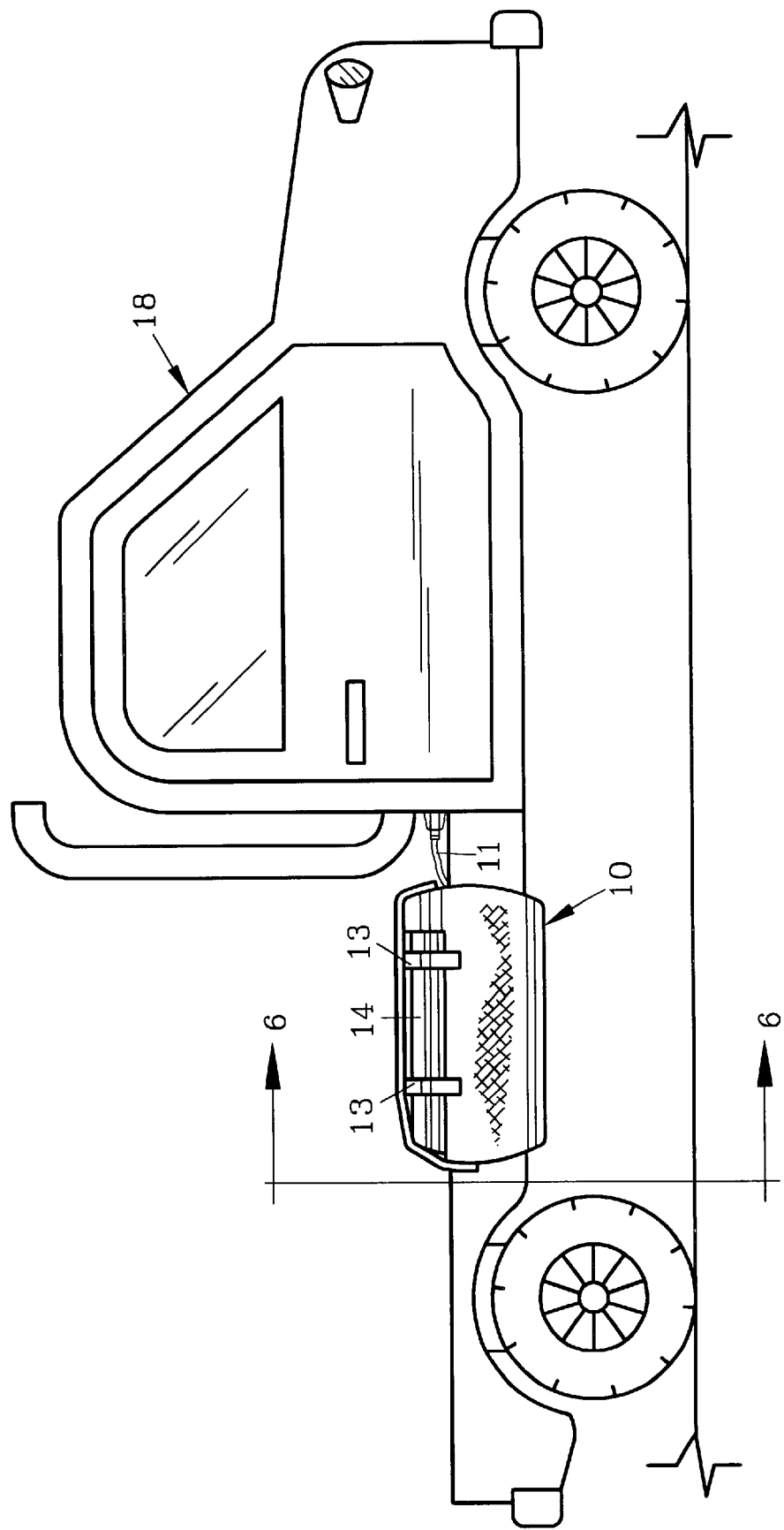
FIG. 5 pictures a left side-view of the preferred embodiment of the invention placed on a fuel tank of a truck.

DETAILED DESCRIPTION OF THE DRAWINGS AND THE PREFERRED EMBODIMENT OF THE INVENTION

FIG. 1 illustrates a side-view of the preferred embodiment. Flexible cover 10 contains a heating element 15 placed on typical diesel fuel tank 14 and held in place by one longitudinal strap 12 positioned over fuel tank 14 and two lateral straps 13 positioned thereacross. Cord 11 is connected to resistance heating element wires 16 (see FIG. 3) contained within cover 10 for supplying DC power thereto.

FIG. 2 illustrates a top view of the preferred embodiment as shown in FIG. 1. Flexible cover 10 has a semi-cylindrical portion 10b that covers substantially the lower half of the longitudinal surface of fuel tank 14, a first or front-end portion 10a that covers all of the front end of fuel tank 14 and approximately one-eighth of the upper half of the longitudinal surface of fuel tank 14, and a second or rear-end portion 10c that partially covers the opposing end of fuel tank 14. The front end of fuel tank 14 is completely covered as air strikes the surface during driving and cover portion 10a acts as a shield for the tank.

FIG. 3 illustrates an exploded side view schematic of the components of the preferred flexible cover 10; a first end portion 10a; a semi-cylindrical portion 10b that covers the lower half of the longitudinal surface of fuel tank 14, and a second end portion 10c that covers the lower half of the opposing end of fuel tank 14. As further seen a large top opening is provided for easy installation on mounted fuel tanks. Portions 10a, 10b and 10c are sewn or otherwise joined with heating resistant wires 16 also being connected.

FIG. 4 illustrates a rear view of the preferred embodiment with strap 13 unattached at one end to show hook and loop (Velcro®, for example) fastener 17. Other fasteners can be used such as adhesives, snaps, buckles or the like.

Figure 6:
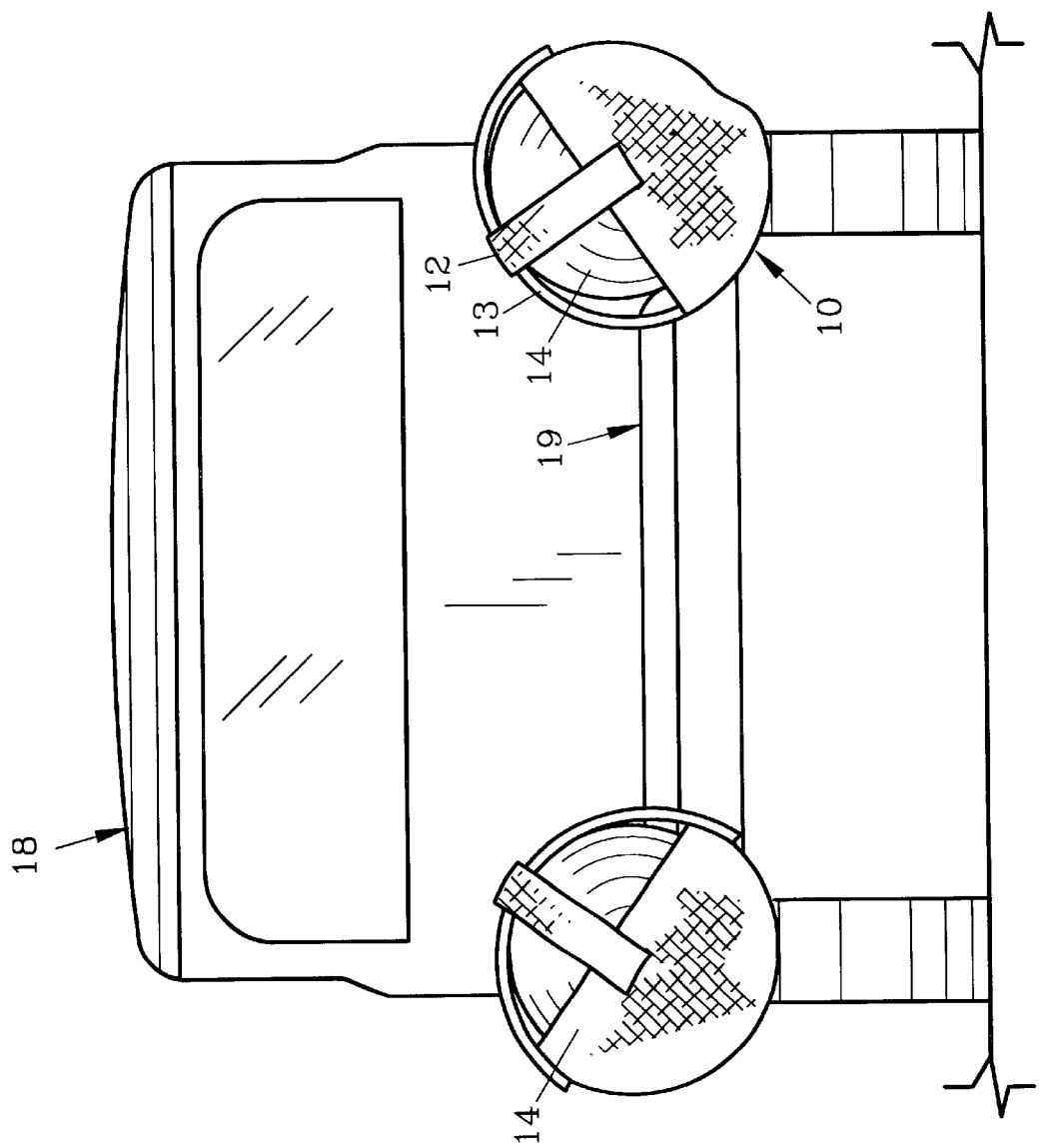
FIG. 6 illustrates an enlarged rear-view of the truck as shown in FIG. 5 along 6—6.

FIG. 5 illustrates a side view of truck 18 with cover 10 on fuel tank 14. FIG. 6 demonstrates an enlarged rear view of truck 18 along lines 6—6 of FIG. 5 with cover 10 rotated approximately 35 degrees to accommodate fuel connector line 19 which runs between dual fuel tanks 14.

In use, cord 11 is connected to a D.C. power source and activated by a switch (not seen) as necessary. Heating element 15 then becomes warm and supplies heat to fuel tank 14, keeping diesel fuel therein from gelling. Thereafter, power can be switched off or disconnected when no more heat is required.

The illustrations and examples provided herein are for explanatory purposes and are not intended to limit the scope of the appended claims.

I claim:

1. Apparatus for heating diesel fuel in the tank of a vehicle comprising:

a flexible cover for the vehicle tank, said cover comprising a semi-cylindrical portion, a front end, said front end joined to said semi-cylindrical portion, said front end extending the full diameter of the tank, a longitudinal strap, said longitudinal strap joined to said front end and extending along said semi-cylindrical position to maintain said cover on said tank, a heating element contained within said cover, and a cord connected to said heating element, capable of supplying power thereto.

2. The apparatus of claim 1 wherein said cover further comprises a second end, said second end joined to said cover in opposing relation on said semi-cylindrical portion to said front end, said second end smaller than said front end to allow exposure of the fuel tank.

3. The apparatus of claim 1, wherein said first end comprises a panel that extends approximately one-eighth of the longitudinal distance of said semi-cylindrical shape.

4. The apparatus of claim 1 further comprising a first lateral strap, said first lateral strap affixed to said cover transverse of said longitudinal strap.

5. The apparatus of claim 4 further comprising a second lateral strap, said second lateral strap attached to said cover parallel to said first lateral strap.

6. The apparatus of claim 1 wherein said longitudinal strap is releasably joined to said cover.

7. The apparatus of claim 6, wherein said longitudinal strap comprises a hook and loop fastener.

8. On a vehicle having a fuel tank subjected to extremely cold temperatures which can cause diesel fuel within the tank to gel, the improvement comprising:

a flexible fuel tank cover, said cover comprising an inner ply and an outer ply of insulating material, resistance wires, said resistance wires positioned between said inner and outer plies, an electrical cord, said electrical cord connected to said resistance wires, said resistance wires for receiving D.C. power for heating the same, said cover comprising a semi-cylindrical portion, a front end portion, said front end portion joined to said semi-cylindrical portion for shielding said fuel tank from air-striking said fuel tank as said vehicle is driven, a longitudinal strap, said longitudinal strap attached to said cover and extending from one end to the other of said cover, a lateral strap, said lateral strap releasably joined to said cover and contiguous said longitudinal strap whereby said cover can be secured on the vehicle fuel tank by said longitudinal and said lateral straps while said resistance wires heat the diesel fuel within the tank.

9. The vehicle fuel tank cover of claim 8 wherein said cover further comprises a second end portion, said second end portion joined to said semi-cylindrical portion.

10. The vehicle fuel tank cover of claim 9 wherein said longitudinal strap is connected to said front end portion and said second end portion of said cover.

* * * * *